April 2, 1940. W. E. WENTWORTH 2,195,948
PLOW
Filed March 2, 1939 2 Sheets-Sheet 1

Inventor
W. E. Wentworth.
By Lacey & Lacey,
Attorneys

April 2, 1940.   W. E. WENTWORTH   2,195,948
PLOW
Filed March 2, 1939   2 Sheets-Sheet 2

Inventor
W. E. Wentworth.
By Lacey & Lacey,
Attorneys

Patented Apr. 2, 1940

2,195,948

UNITED STATES PATENT OFFICE 2,195,948

PLOW

William E. Wentworth, Von Ormy, Tex.

Application March 2, 1939, Serial No. 259,431

6 Claims. (Cl. 97—45)

This invention relates to plows to be used in permanent pastures or where diversified farming is in practice for the treating of soil to retain rain water, snow and moisture in the ground for irrigation purposes.

The object of the invention is to provide a plow of simple and efficient construction, the plow shares of which are so arranged as to form short furrows or depressions in a hillside at predetermined intervals for catching and retaining water during a rain fall, thereby to prevent wasting of the top soil or fertilizer and permitting the collected water to soak into the ground and thoroughly irrigate the same.

A further object of the invention is to provide a plow comprising a wheeled frame having a plurality of spaced beans pivotally mounted thereon and provided with depending plow shares, means being provided for successively raising and lowering the beams and means for adjusting said beams both laterally and longitudinally of said frame.

A still further object of the invention is generally to improve this class of devices so as to increase their utility, durability and efficiency.

Figure 1:
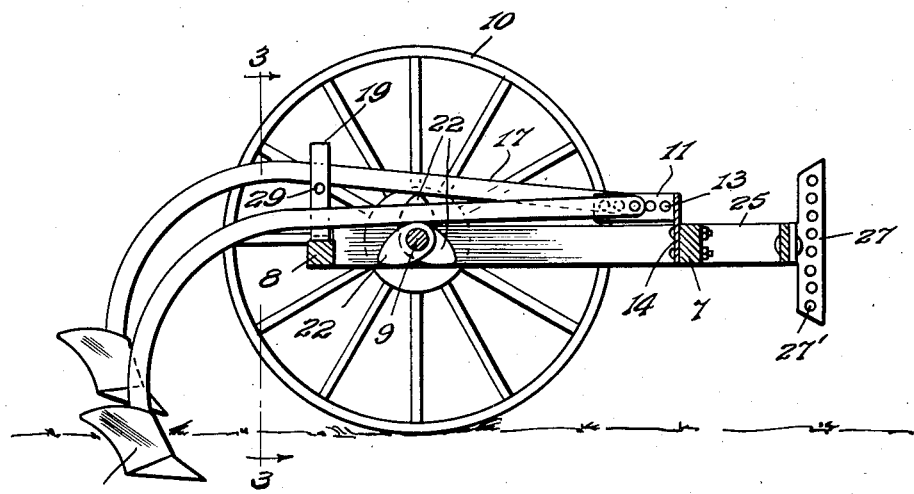
Figure 2:
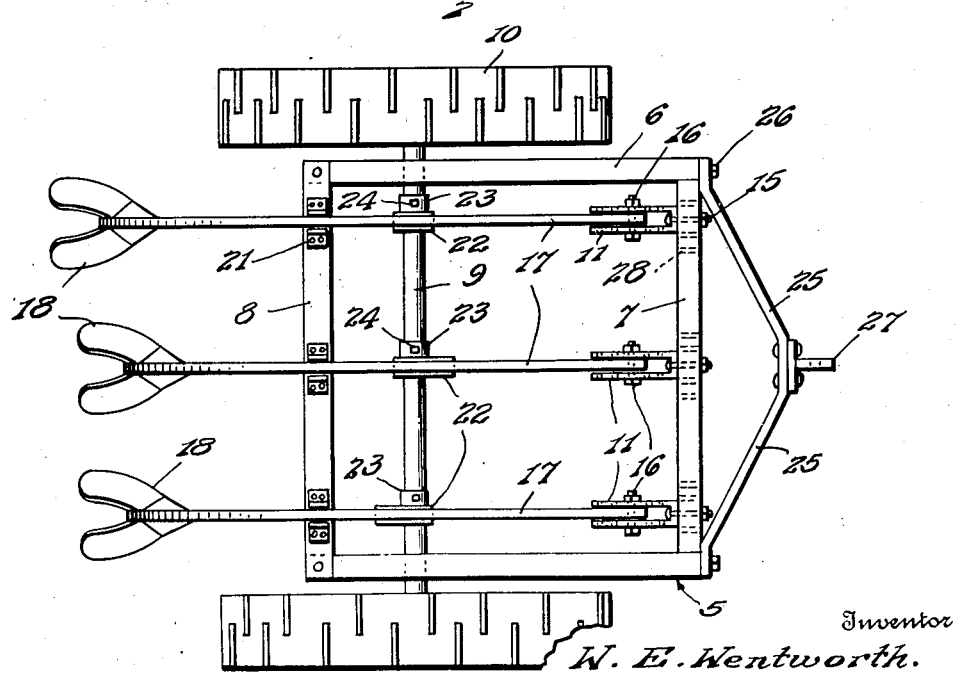
Figure 3:
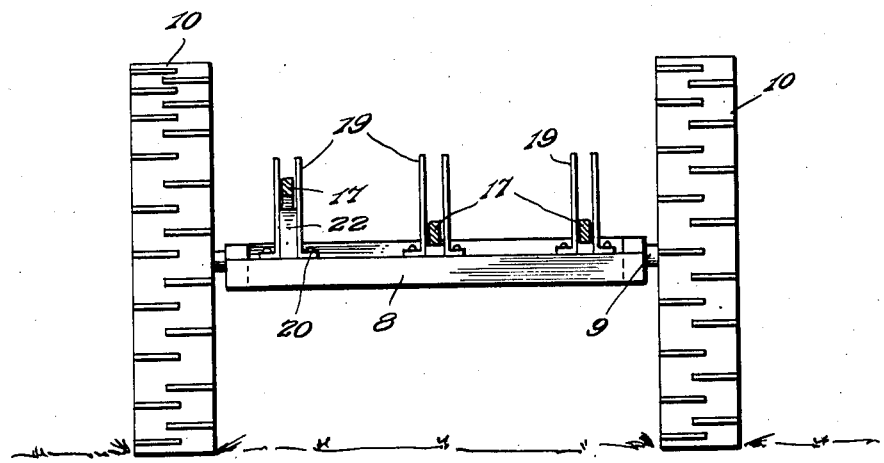
Figure 4:
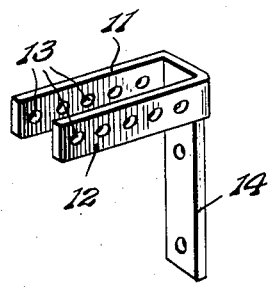
Figure 5:
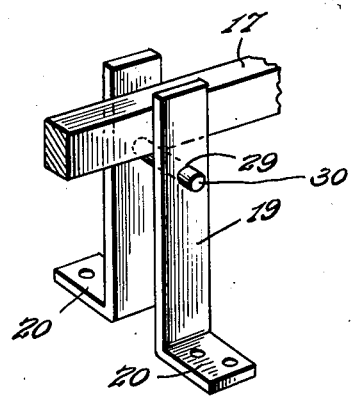

In the accompanying drawings forming a part of this specification and in which similar numerals of reference indicate corresponding parts in all the figures of the drawings:

Figure 1 is a longitudinal sectional view of a plow embodying the present invention, Figure 2 is a top plan view, Figure 3 is a vertical sectional view taken on the line 3—3 of Figure 1, Figure 4 is a perspective view of one of the beam-supporting brackets, and Figure 5 is an enlarged detail perspective view showing the manner of supporting the plow beams in elevated position when transfering the plow from one field to another.

The improved plow forming the subject-matter of the present invention comprises a main supporting frame 5 including spaced side sills or bars 6 to which are attached in any suitable manner front and rear transverse sills or bars 7 and 8. Mounted for rotation in the side bars 6 of the supporting frame is an axle 9 carrying ground wheels 10 which ground wheels are provided with the usual ratchet mechanism to enable the plow to turn with ease. Secured to the front transverse bar 7 are a plurality of spaced supporting brackets 11 each consisting of a U-shaped portion 12 having a series of openings 13 formed therein and a depending portion 14 which bears against the inner face of the transverse bar 7 and is adjustably secured thereto by bolts or similar fastening devices 15. Pivotally mounted on bolts 16 extending through the supporting brackets are plow beams 17 having their rear ends curved downwardly and terminating in plow shares 18 of any suitable construction. Secured to the rear transverse bar 8 of the supporting frame are spaced upright guides 19 adapted to receive the adjacent plow beams 17 and prevent lateral movement or twisting of the plow beams when they are moved to raised or lowered position. These guides 19 are provided with lateral feet 20 which are secured to the bar 8 by screws or similar devices 21. Mounted on the axle 9 are a plurality of cams 22 each provided with a collar 23 and a set screw 24 to permit the cams to be adjusted longitudinally of the axle. One cam is mounted immediately below each plow beam 17 and said cams are disposed at approximately one hundred and twenty degrees with respect to each other so that, as the axle 9 rotates, the plow shares will be successively elevated above the ground. An outwardly bowed draft yoke 25 is secured at its opposite ends by a bolt 26 to the supporting frame, and mounted in the central portion of said draft yoke is a vertical hitch or draft member 27 for attachment to draft animals, an automobile or other source of motive power for moving the plow over the surface of a hillside or field. The hitch member is provided with a vertical row of openings 27' so that by hooking the tractor in the bottom hole the plows will go deeper and by hooking the tractor in the top hole the plows will work higher. It will be noted that, inasmuch as the supporting brackets 11 are provided with a series of spaced transversely alined openings, the plow beams 17 may be adjusted longitudinally of the supporting frame and lateral adjustment of the beams with respect to the supporting frame to vary the distance between said beams may be effected by inserting the securing bolts 15 through any one of a series of auxiliary openings 28 formed in the front transverse bar of the frame. Likewise, the position of the cams 22 may be changed to coincide with the spacing of the beams 17 by loosening the clamping screws 14 and sliding said cams along the axle to the desired position. It will, of course, be understood that, when the spacing of the plow beams 17 is changed, the guides 19 will be correspondingly changed to agree therewith and in which position they will be securely held by tightening the fastening screws 21. The upper or free ends of the guides 19 are formed with transversely alined openings 29 adapted to receive a pin 30 for the purpose of supporting the plow beams in elevated position when the plow is not in use or, in other words, when the plow is being transported from one field to another.

It will thus be seen that as the plow is drawn over the surface of a hillside the plow shares 18 will successively dig into the ground and form short furrows or openings therein in which water may collect during a rain fall. This collected water will soak into the soil and thoroughly irrigate the same so as to increase its fertility. As the plow is drawn over the hillside, the cams by engagement with the lower faces of the adjacent plow beams 17 will successively elevate said beams so as to withdraw the respective plow shares from the ground. This type of plow is particularly desirable for use on a hillside where the ground is dry and very hard. As under ordinary conditions, when there is a heavy rain fall, the water tends to wash away the top soil and any fertilizer that may be placed thereon, thereby not only impoverishing the soil but forming deep gullies therein. By treating the ground with a plow of the character described, the rain water will collect in the depressions or holes formed in the ground by the plow shares and thus conserve the rain water which will soak into the ground and irrigate the crops during a subsequent dry spell.

It will, of course, be understood that the plows may be made in different sizes and shapes and constructed of any suitable material without departing from the spirit of the invention. It will also be understood that any desired number of plow beams may be mounted on the supporting frame and that the plow shares may be of any construction capable of forming spaced openings or depressions in the ground for the reception of rain, snow or other moisture.

Having thus described the invention, what is claimed as new is:

1. A plow including a supporting frame, an axle journaled on the frame and provided with ground wheels, supporting brackets mounted on and adjustable laterally of the supporting frame, plow beams pivotally mounted for longitudinal adustment within the supporting brackets and provided with terminal plow shares, a guide for each plow share, and spaced cams adjustably mounted on the axle for successively elevating the plow shares.

2. A plow including a supporting frame, an axle journaled on the frame and provided with ground wheels, supporting brackets mounted on and adjustable laterally of the frame, plow beams pivotally mounted for longitudinal adjustment within said brackets and provided with terminal plow shares, spaced guides secured to the rear portion of the frame and between which the plow beams are free to move, cams mounted on the axle for successively elevating the plow beams, and pins extending through the guides and adapted to bear against the lower faces of the plow beams for supporting said plow beams in elevated position when the plow is not in use.

3. A plow comprising a supporting frame including spaced side bars connected by front and rear transverse bars, the front transverse bars being formed with a series of openings, an axle journaled in the side bars, ground wheels carried by the axle, substantially U-shaped supporting brackets mounted on the frame and provided with depending attaching plates, there being a series of spaced transversely alined openings formed in each supporting bracket, bolts extending through the attaching plates and the adjacent openings in the front transverse bar, plow beams fitted within the supporting brackets, bolts extending through the plow beams and the adjacent openings in said supporting brackets, plow shares carried by the beams, spaced upright guides secured to the rear transverse bar of the frame and disposed on opposite sides of each plow beam, cams adjustably mounted on the axle and adapted to successively elevate the plow beams, and means carried by the guides for supporting the plow beams in elevated position.

4. A plow including a supporting frame having spaced side bars connected by front and rear transverse bars, a yoke secured to the frame in front of the forward transverse bar and provided with a draft device, an axle journaled in the side bars of the frame, ground wheels carried by the axle, brackets mounted on the front transverse beam and adjustable transversely of the frame, plow beams pivotally mounted within the brackets and adjustable longitudinally with respect thereto, plow shares carried by the plow beams, cams mounted on the axle for successively elevating the plow beams, means mounted on the rear transverse bar of the frame for guiding the plow beams, and means for supporting the plow beams in elevated position.

5. A plow including a frame, axle and ground wheels, plow beams mounted on the frame and adjustable longitudinally and laterally with respect thereto, plow shares carried by the beams and adapted to successively enter the ground for forming spaced water-retaining openings therein at predetermined intervals, and cams mounted on the axle for successively elevating the plow shares above the surface of the ground.

6. A plow including a wheeled frame, a plurality of plow beams pivotally mounted on the frame and adjustable longitudinally and laterally with respect thereto, said beams being provided with terminal plow shares adapted to successively enter the ground for forming rain-receiving depressions therein, means for successively elevating the plow shares above the surface of the ground, and means for supporting said plow beams in inoperative position when the plow is moved from one field to another.

WILLIAM E. WENTWORTH.